United States Patent
Ransom

(10) Patent No.: US 7,001,130 B2
(45) Date of Patent: Feb. 21, 2006

(54) ROBOTIC RACK LOADING APPARATUS AND METHOD

(75) Inventor: Lance T. Ransom, Essex (CA)

(73) Assignee: General Motors Corporation, Detroit, MI (US)

( * ) Notice: Subject to any disclaimer, the term of this patent is extended or adjusted under 35 U.S.C. 154(b) by 168 days.

(21) Appl. No.: 10/023,238

(22) Filed: Dec. 18, 2001

(65) Prior Publication Data

US 2003/0113192 A1 Jun. 19, 2003

(51) Int. Cl.
*B65D 85/68* (2006.01)

(52) U.S. Cl. ................. 414/416.08; 206/448; 211/41.1

(58) Field of Classification Search ................ 414/274, 414/275, 416.08, 736, 737; 901/35, 45; 410/32, 410/43, 143; 294/907; 211/41.1, 41.14; 206/448

See application file for complete search history.

(56) References Cited

U.S. PATENT DOCUMENTS

| | | | | |
|---|---|---|---|---|
| 2,946,453 A | * | 7/1960 | Pityo | 211/41.14 |
| 3,824,674 A | * | 7/1974 | Inoyama et al. | 29/407.05 |
| 4,083,461 A | * | 4/1978 | Wangermann | 414/792.9 |
| 4,493,606 A | * | 1/1985 | Foulke et al. | 414/787 |
| 4,702,667 A | * | 10/1987 | Hounsfield et al. | 414/735 |
| 4,852,237 A | * | 8/1989 | Tradt et al. | 29/407.05 |
| 4,993,559 A | * | 2/1991 | Cota | 211/41.18 |
| 5,098,254 A | * | 3/1992 | Becicka et al. | 414/792.9 |
| 5,141,114 A | * | 8/1992 | Cate et al. | 211/85.8 |
| 5,255,797 A | * | 10/1993 | Kos | 211/41.18 |
| 5,273,159 A | * | 12/1993 | Gregerson | 206/711 |
| 5,303,034 A | * | 4/1994 | Carmichael et al. | 356/620 |
| 5,632,590 A | * | 5/1997 | Pearson et al. | 414/404 |
| 5,706,946 A | * | 1/1998 | Kakizaki et al. | 206/454 |
| 6,213,705 B1 | * | 4/2001 | Wilson | 414/274 |
| 6,286,688 B1 | * | 9/2001 | Mimken et al. | 211/41.18 |
| 6,473,985 B1 | * | 11/2002 | Won et al. | 33/644 |
| 6,550,623 B1 | * | 4/2003 | Cook et al. | 211/13.1 |
| 6,758,346 B1 | * | 7/2004 | Kollegian | 211/40 |

FOREIGN PATENT DOCUMENTS

| | | | |
|---|---|---|---|
| GB | 2189458 | * | 10/1987 |
| JP | 8-96471 | * | 4/1996 |

* cited by examiner

*Primary Examiner*—James W. Keenan
(74) *Attorney, Agent, or Firm*—Laura C. Hargitt

(57) ABSTRACT

Robotic rack loading apparatus and method include features and loading steps that provide essentially damage free rack loading of automotive panel assemblies into a specially designed rack. The rack includes dunnage elements containing sets of slots with lead-in upper edge angles and sensing holes associated with the slots. The robot carries a modified end of arm tool including a sensor to sense the location of a sensing hole to position a panel for loading into a corresponding set of slots. Another sensor preferably senses objects or structure in the rack to position the tool in a preload position. A compliant device allows lateral and longitudinal compliance of the end of arm tool to allow assemblies to be funneled into position in the slots without encountering damaging stress. A programmed robot can thus automatically load panel assemblies into the rack without damage.

2 Claims, 4 Drawing Sheets

ROBOTIC RACK LOADING APPARATUS AND METHOD

TECHNICAL FIELD

This invention relates to robotic rack loading of panel assemblies such as hoods, deck lids, doors and other components such as radiator supports. In particular, the invention relates to a method and apparatus for rack loading of panel assemblies by a programmed robot.

BACKGROUND OF THE INVENTION

It is known in the art to provide for the robotic loading of manufactured components into racks for temporary storage. However, the tolerances in the positioning of the racks, the location of slots in the dunnage, and the manner of the slots being located by the robot all combine to create difficulties in the loading of such panel assemblies, which may result in damage to panel assemblies and their finished surfaces. An improved apparatus and method are therefore desired to provide the capability of satisfactorily loading finished panel assemblies into a temporary storage rack without damaging the assemblies.

SUMMARY OF THE INVENTION

The present invention provides a robotic rack loading apparatus and method which include novel features and loading steps that provide the desired result of essentially damage-free rack loading of automotive panel assemblies into a specially designed rack.

The rack includes upper and lower rows of dunnage elements containing slots which are arranged in sets including two opposing upper slots and two aligned lower slots for each set. The rack design includes modified lead-in angles or funnel-like guide surfaces in the upper rows of slots in the rack dunnage. The dunnage elements of at least one of the upper rows also include indicators in the form of sensing holes associated one with each of the slots in the row and positioned adjacent their respective slots for indicating to a sensor the position of each of the slots.

The robot is provided with a conventional end of arm tool for picking up and supporting panels for loading. The tool is modified by including a sensor which is adapted to sense the location of the indicator holes and thereby align the tool in position to load a panel into the corresponding set of slots. Another sensor is preferably provided on the tool for sensing an object in the rack or the end structure of the rack in order to position the tool in a preload position ready for loading of a panel assembly.

The robot arm is also provided with a known compliant device which is lockable in a fixed position relative to the arm but which when unlocked allows lateral and longitudinal compliance or motion of the supported end of arm tool relative to the robot arm position.

The novel features of the apparatus are utilized in carrying out the loading steps for placing panel assemblies in the rack, including at a minimum:

supporting an assembly in a selected position on the end of arm tool;

moving the tool to a preload position;

advancing the tool until the indicator is sensed by the sensor and stopping the tool at the sensed loading location;

lowering the tool until the panel reaches the lead-in surfaces of the upper slots;

further lowering the tool to a drop off position, the compliant support allowing the panel to be guided by the lead-in surfaces into the set of slots with a minimum of stress;

releasing the part; and moving the tool to a final position for the cycle.

These and other features and advantages of the invention will be more fully understood from the following description of certain specific embodiments of the invention taken together with the accompanying drawings.

DESCRIPTION OF THE PREFERRED EMBODIMENT

Figure 1:
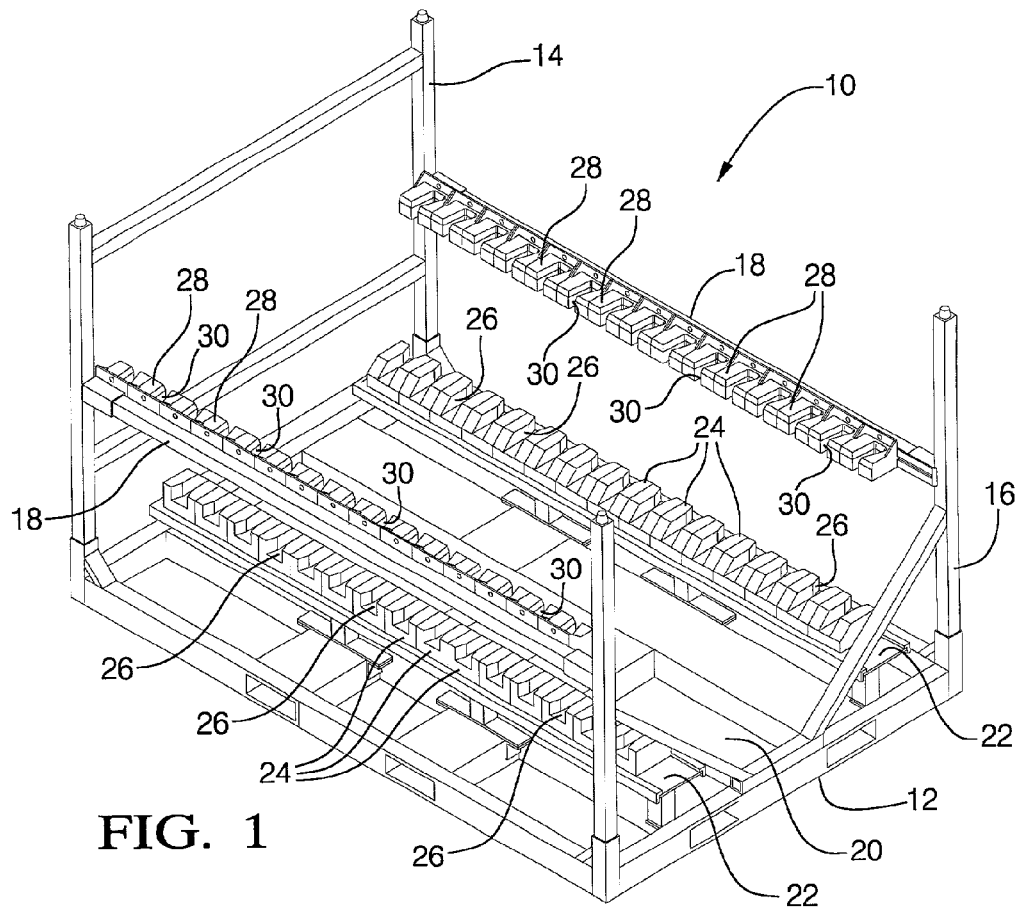
FIG. 1 is a pictorial view of a rack having special dunnage in accordance with the invention.

Referring first to FIG. 1 of the drawings in detail, numeral 10 generally indicates a panel loading rack formed in accordance with the invention. Rack 10 includes a base 12 capable of being picked up by a forklift truck from any side of the rack. The base supports a back 14 and a front 16 connected longitudinally by side support members 18. The front 16 includes an open central portion 20 to permit front entry of a loading tool, and the base includes horizontal support members on which are mounted bottom supports 22.

The bottom supports are slotted longitudinally to receive a plurality of individual plastic dunnage members 24 having transverse slots 26 opening upward. The side supports 18 are slotted to receive individual plastic dunnage members 28 having vertical slots 30 opening inwardly. Slots 26, 30 are arranged in the rack in sets, each set including two laterally aligned lower transverse slots 26 and two laterally aligned vertical side slots 30 positioned to receive a single panel assembly for storage.

Figure 2:
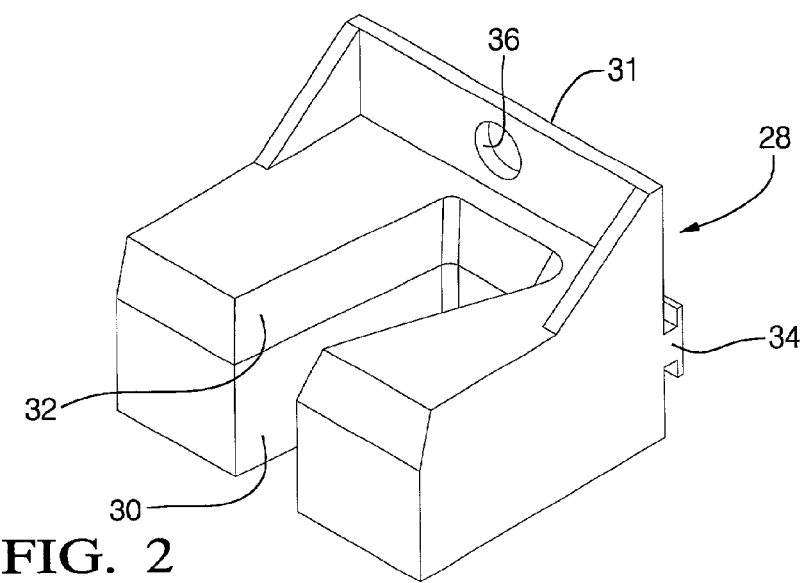
FIG. 2 is a pictorial view of a single dunnage element from an upper row, the dunnage element having a single pre-configured slot with angular lead in surfaces along its upper edge and a sensing hole aligned with the slot and extending through an upper lip of the dunnage element.

FIG. 2 illustrates a single one of the side dunnage members 28. Member 28 is preferably formed of a resilient plastic material molded to a supporting back 31 and adapted to receive in the slot a finished panel without scratching or damaging its finished surface. The plastic material carries a vertical slot 30 having a slightly angled configuration shaped to accept the edge of a particular panel to be loaded. Upper edge surfaces 32 of the slot 30 are angled inward to guide or funnel a panel inserted from above into the slot. On the back 31 of the member 28 is a T-retainer 34 adapted to be retained in a mating slot formed in one of the side support members 18. In an upper portion of back 31, there is formed a sensing hole 36 which is generally aligned with the vertical slot 30 and provides an indicator for indicating the location of the slot in the rack.

Figure 3:
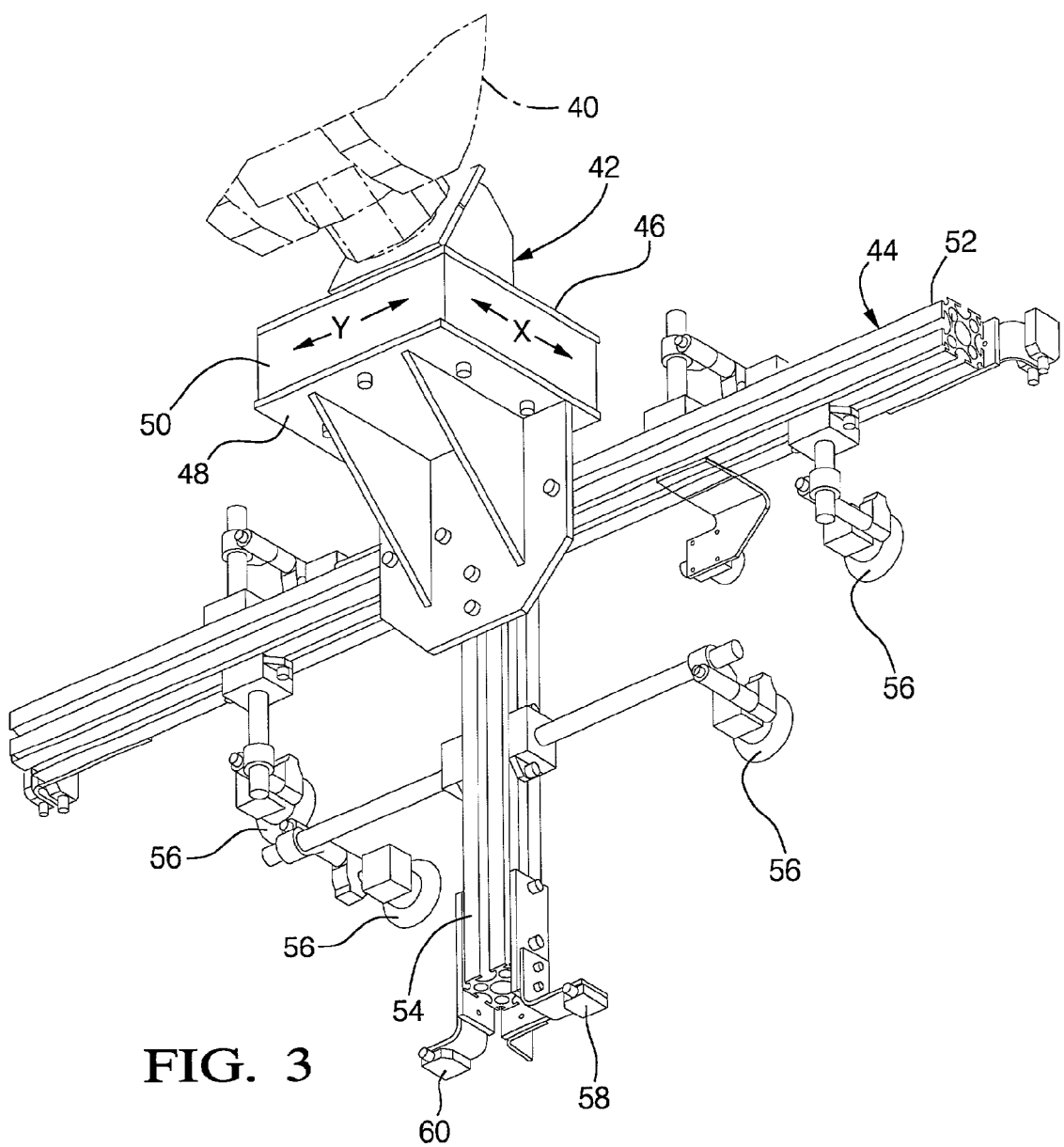
FIG. 3 is a pictorial view of an end of arm tool supported through a compliant device on the end of a robot arm.

Referring now to FIG. 3, there is shown an end of a robot arm 40 to which is attached a lockable compliant support 42 that in turn carries an end of arm tool 44.

The robot arm 40 is a typical universal arm movable in any direction and rotatable to reach from one position to another in a predetermined area. The compliant device 42 attached to the arm 40 includes upper and lower spaced parallel plates 46, 48 bonded to a compliant material 50 between the plates. The compliant material allows lateral and longitudinal adjustment of the lower plate within a predetermined dimension by compliant deformation of the support material 50. The support 42 includes a locking device, not shown, which acts when locked to fix the positions of the upper and lower plates relative to one another so that the end of arm tool is positioned in a fixed relation to the robot arm itself.

The end of arm tool 44 includes horizontal and vertical arms 52, 54. These arms are slotted to receive support members carrying suction cups 56 which are connected to an internal source of vacuum for use in picking up and carrying individual panels to be loaded into the rack. Adjacent its lower end, the vertical arm 54 also carries a first sensor 58 and a second sensor 60. The first sensor 58 is operable to sense an object in the forward path of the tool 44, such as the back of the rack or a previously loaded panel, which indicates that further forward movement of the tool should be halted. The second sensor is used to sense the locations of each of the sensing holes 36 in the side dunnage members in order to align the tool 44 properly for loading of a panel in the associated set of slots in the rack.

Figure 4:
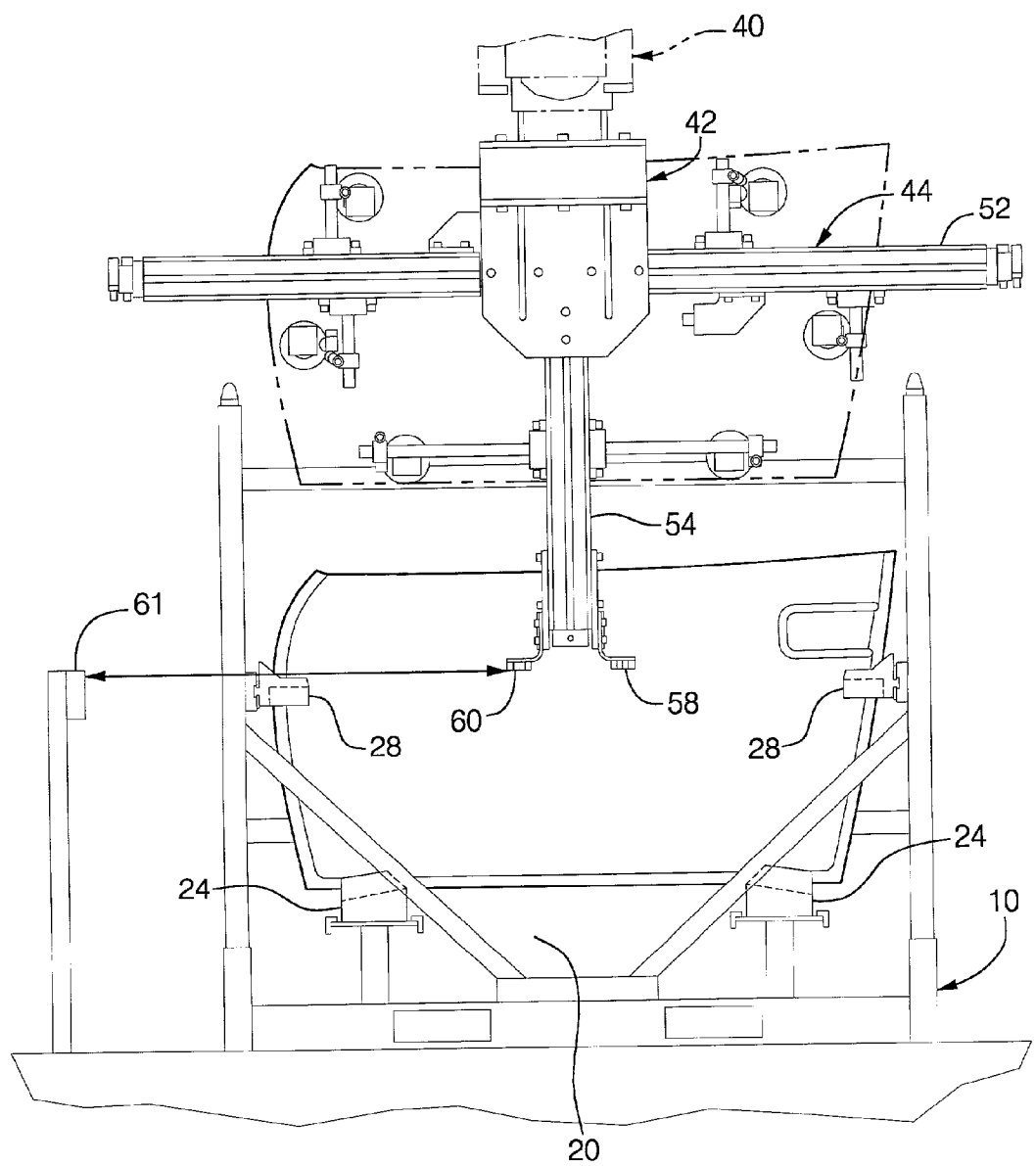
FIG. 4 is a front end view illustrating the relationship between the rack and the robot end of arm tool during the loading of a panel, the panel being omitted from the drawing for clarity.

FIG. 4 shows the relationship of the rack 10 and the robot carried tool 44 during a step in loading of a panel into the rack. The panel itself is not shown for clarity. The tool 44 is positioned where the sensor 60 is aligned with a sensing hole and the signal is returned by a reflector 61 to indicate alignment of a panel with the associated set of slots 26, 30.

Figure 5:
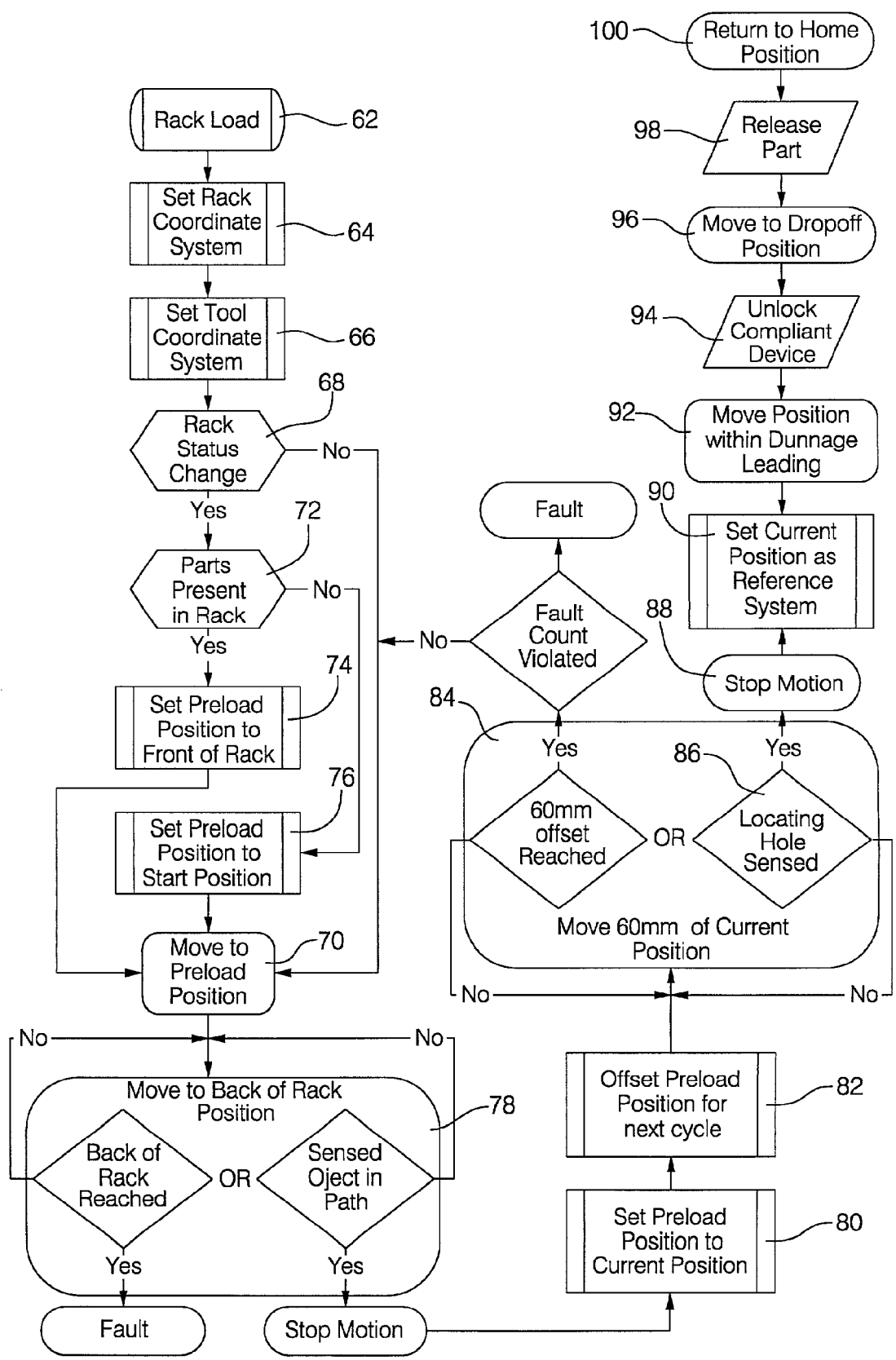
FIG. 5 is a flow chart illustrating steps in a selected method of robot rack loading.

The method of operating a robot rack loading apparatus to provide damage-free loading of automotive panels in the rack 10 is shown by a flow chart of the process illustrated in FIG. 5. In order to initiate a rack load process 62, a panel or other assembly is first picked up by the tool 44 using any suitable procedure. The rack load function 62 is then selected by the programmable logic controller, not shown, which is programmed in the robot to then set the rack coordinate system at 64 and set the tool coordinate system at 66. If the rack status has not changed, the tool is moved from an initial position at 68 to a preload position at 70. However, if a new rack has been provided or the rack is moved, the controller determines at 72 whether parts are present in the rack and, if so, at 74 sets a preload position at the front of the rack. If parts are not present in the rack, then at 76 the preload position is established at a start position near the back of the rack.

From the preload position at 70, the tool 44 carrying a panel is moved toward the back of the rack, having previously picked up a panel by a conventional process not forming part of the present invention. As the tool 44 is moved at 78, the sensor 58 indicates the approach of the arm to either the back of the rack or to an object such as a stored panel in the rack. If neither is sensed and the back of the rack is reached, then a fault is detected and the arm is repositioned at the preload position for a second try. When an object in the path or the back of the rack is detected, movement is stopped and the preload position is set to the then current position at 80. Then, at 82 an offset location is stored for use in establishing the preload position for the next cycle. Thereafter at 84 the tool is advanced a set interval forward until a sensing hole 36 is sensed at 86. If the system fails to locate a sensing hole and the set interval is reached, a fault is detected and the system recycles for another try.

Upon reaching a sensing hole 36, the arm is stopped and the current position is set at 90 as a reference for the coordinate system. The tool 44 is then lowered until the lower edge of the panel to be loaded reaches the angled upper edge surfaces 32 of the side dunnage slots of the respective set of slots. At this point, the compliant support 42 is unlocked at 94 and the tool is moved further downward at 96 to a dropoff position at which the part is to be released. During this motion, the compliant device allows the panel to be guided or funneled into the associated set of four slots in which it is to be loaded by the angled or funnel-like upper edge surfaces 32 of the vertical slots 30 so that a panel is moved into the set of slots with a motion free from any stress applied by the robot arm motion. The panel then reaches the drop off point without being damaged. At this point, the loaded panel is released at 98 and the tool 44 is returned to its home position at 100. The compliant device is then locked and the robot arm carries the tool 44 to pick up a second panel to be loaded into the rack and the process is repeated as desired or until the rack is loaded.

Obviously, numerous changes could be made in specific aspects of the loading method described in order to ensure positive and safe loading of each of the panels into the rack with a minimum of complexity in the various steps while ensuring that the operation is carried out without faults which might damage any of the panels being loaded. In addition, modifications of the novel components as described may be made without departing from the inventive concepts described regarding the apparatus and the method of its operation.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A robot rack loading apparatus for temporary rack storage of vehicular panel assemblies, the apparatus comprising:
   a rack for storage of multiple panel assemblies, the rack including side and bottom plastic dunnage molded to a supporting back that is coupled to the rack, the side and bottom dunnage having slots for receiving individual assemblies;
   a tool mountable on a robot arm and adapted for sequentially carrying individual assemblies for loading into the rack; and
   a lockable compliant support between the robot arm and the tool, the lockable compliant support having a compliant mode and a locked mode, wherein the tool moves relative to the robot arm in the compliant mode in response to self-adjustment of the individual assemblies' positions during placement of the individual assemblies into the slots.

2. A robot rack loading apparatus comprising:
   a rack that includes a plurality of plastic dunnage members, each having a slot for receiving a vehicular panel assembly, wherein each of said dunnage members is formed of plastic and molded to a supporting back;
   a tool mountable on a robot arm that carries said vehicular panel assembly for loading into said rack; and a lockable compliant support between said robot arm and said tool, said lockable compliant support having a compliant mode and a locked mode, wherein said tool moves in at least two directions relative to said robot arm in said compliant mode in response to self-adjustment of a vehicular panel assembly's position during placement of said vehicular panel assembly into said slot.

* * * * *